United States Patent
Elahi et al.

(10) Patent No.: US 9,087,051 B2
(45) Date of Patent: Jul. 21, 2015

(54) PROGRAMMABLE PERIPHERAL INTERCONNECT

(71) Applicant: NORDIC SEMICONDUCTOR ASA, Trondheim (NO)

(72) Inventors: Junaid Elahi, Oslo (NO); Joar Olai Rusten, Trondheim (NO); Lasse Olsen, Trondheim (NO); Lars Sundell, Moss (NO)

(73) Assignee: NORDIC SEMICONDUCTOR ASA, Trondheim (NO)

( * ) Notice: Subject to any disclaimer, the term of this patent is extended or adjusted under 35 U.S.C. 154(b) by 11 days.

(21) Appl. No.: 14/351,870

(22) PCT Filed: Dec. 6, 2012

(86) PCT No.: PCT/GB2012/053025
§ 371 (c)(1),
(2) Date: Apr. 14, 2014

(87) PCT Pub. No.: WO2013/088121
PCT Pub. Date: Jun. 20, 2013

(65) Prior Publication Data
US 2014/0304439 A1     Oct. 9, 2014

(30) Foreign Application Priority Data
Dec. 12, 2011  (GB) .................................. 1121292.5

(51) Int. Cl.
*G06F 3/00* (2006.01)
*G06F 13/28* (2006.01)
(Continued)

(52) U.S. Cl.
CPC .............. *G06F 13/287* (2013.01); *G06F 13/24* (2013.01); *G06F 13/385* (2013.01); *Y02B 60/1228* (2013.01)

(58) Field of Classification Search
CPC ..... G06F 13/287; G06F 13/385; G06F 13/24; Y02B 60/1228
See application file for complete search history.

(56) References Cited

U.S. PATENT DOCUMENTS 5,579,531 A * 11/1996 Sugita ............................. 710/51
6,286,060 B1 * 9/2001 DiGiorgio et al. .............. 710/31
(Continued)

FOREIGN PATENT DOCUMENTS

EP  0738978 A1  10/1996
EP  0811922 A1  12/1997
(Continued)

OTHER PUBLICATIONS

Notification of Transmittal (PCT/ISA/220) of the International Search Report (PCT/ISA/210) and the Written Opinion of the International Searching Authority (PCT/ISA/237) for PCT/GB2012/053025 mailed Mar. 4, 2013.
(Continued)

*Primary Examiner* — Jing-Yih Shyu
(74) *Attorney, Agent, or Firm* — Koppel, Patrick, Heybl & Philpott (57) ABSTRACT

Peripherals (18, 20, 22, 24, 26) are connected to a processor (6) and a programmable peripheral interconnect (10) is connected to each peripheral. One of the peripherals (18) is configured to signal an event to the interconnect, and one of the peripherals (20) is configured to respond to a task signal from the interconnect by performing a task. The task-receiving peripheral (20) has a task register (40), addressable by the processor (6), and performs the task in response to a change in the contents of the register (40). The interconnect (10) accesses a memory (14) in which a mapping is stored between an event of a first peripheral (18) and a task of a second peripheral (20), the mapping comprising (i) an identification of the event, and (ii) the address of a task register (40). The mapping causes the interconnect (10) to provide a channel by sending a task signal to the second peripheral (20) in response to a signal of the event from the first peripheral (18).

32 Claims, 6 Drawing Sheets

(51) Int. Cl.
*G06F 13/24* (2006.01)
*G06F 13/38* (2006.01)

(56) References Cited

U.S. PATENT DOCUMENTS

| | | | | |
|---|---|---|---|---|
| 7,281,066 | B2* | 10/2007 | Rader et al. | 710/51 |
| 7,562,162 | B2* | 7/2009 | Kreiner et al. | 710/11 |
| 8,756,357 | B2* | 6/2014 | Oyama et al. | 710/260 |

FOREIGN PATENT DOCUMENTS

| | | |
|---|---|---|
| EP | 1988460 A1 | 11/2008 |
| FR | 2953307 A1 | 6/2011 |
| WO | WO02054212 A2 | 7/2002 |
| WO | WO2009077341 A1 | 6/2009 |
| WO | WO2011045678 A1 | 4/2011 |
| WO | WO2011067507 A1 | 6/2011 |

OTHER PUBLICATIONS

"AVR1001: Getting Started with the XMEGA Event System; 80-bit AVR Microcontrollers", Amtel Corporation, Rev. 8071A-AVR-02/08.

"EFM32 Peripherals; High Performance Peripherals", Energy Micro AS, Norway, dated Nov. 18, 2011. http://www.energymicro.com/technology/efm32-peripherals.

"EFM32 Peripheral Reflex System; AN0025—Applicationnote", Energy Micro AS, Norway, Oct. 21, 2011—an0025 Rev1.02. www.energymicro.com.

* cited by examiner

Figure 1

| Mapping # | Event Register | Task Register |
| --- | --- | --- |
| 1 | 0x100 | 0x500 |
| 2 | 0x300 | 0x620 |
| 3 | ⋮ | |
| ⋮ | ⋮ | ⋮ |

PROGRAMMABLE PERIPHERAL INTERCONNECT

This invention relates to communication between peripherals connected to a processor.

Microcontroller systems typically comprise a number of peripherals, which are distinct from a central processing unit (CPU), but are connected to it, typically by a bus. These peripherals may be located on the same integrated circuit as the processor (e.g. as a system-on-chip) or within the same multi-chip module or system-in-package. Alternatively, peripherals may be located off-chip from a main processor, e.g. in a different package. Examples of peripherals include a timer, a cryptographic encryption engine, a serial interface (UART), and an embedded radio transceiver.

In a simple architecture, the processor communicates directly with each peripheral. Communication from one peripheral to another is accomplished via the processor, e.g. using interrupts. This mechanism can, however, be slow and lead to unpredictable timings, since the processor may have to wake from a low-power (sleep) state or complete an existing operation before it can relay a message. If the processor is in a sleep state, a communication from one peripheral to another may also result in significant energy consumption due to waking the processor.

Attempts have been made to address these shortcomings by enabling one peripheral to communicate directly with another. For example, an interconnect apparatus may support a number of channels, each of which can be configured by a processor to receive signals from a signal-producing peripheral (e.g. using a multiplexer) and to send signals directly to selected signal-receiving peripherals.

However the Applicant has realised that such attempts can be improved upon.

Thus, from a first aspect, the invention provides a peripheral communication system comprising:
   a processor;
   a plurality of peripherals, connected to the processor; and
   a programmable peripheral interconnect, connected to each peripheral,
wherein:
   at least one of the peripherals is event-generating, being configured to signal an event to the programmable peripheral interconnect;
   at least one of the peripherals is task-receiving, being configured to respond to a task signal from the programmable peripheral interconnect by performing a task;
   said task-receiving peripheral comprises a task register, addressable by the processor, associated with the task, and is configured to perform the task in response to a change in the contents of the task register;
   the programmable peripheral interconnect is configured to access a memory in which a mapping can be stored between an event of a first peripheral and a task of a second peripheral, the mapping comprising (i) an identification of the event of the first peripheral, and (ii) the address of a task register associated with the task; and
   the programmable peripheral interconnect is configured so that, if a mapping is stored in memory between an event of a first peripheral and a task of a second peripheral, the interconnect will provide a channel by sending a task signal to the second peripheral in response to a signal of the event from the first peripheral.

From a second aspect, the invention provides a programmable peripheral interconnect configured for connection to each of a plurality of peripherals, wherein:
   at least one of the peripherals is event-generating, being configured to signal an event to the programmable peripheral interconnect;
   at least one of the peripherals is task-receiving, being configured to respond to a task signal from the programmable peripheral interconnect by performing a task;
   said task-receiving peripheral comprises a task register, addressable by a processor, associated with the task, and is configured to perform the task in response to a change in the contents of the task register;
   the programmable peripheral interconnect is configured to access a memory in which a mapping can be stored between an event of a first peripheral and a task of a second peripheral, the mapping comprising (i) an identification of the event of the first peripheral, and (ii) the address of a task register associated with the task; and
   the programmable peripheral interconnect is configured so that, if a mapping is stored in memory between an event of a first peripheral and a task of a second peripheral, the interconnect will provide a channel by sending a task signal to the second peripheral in response to a signal of the event from the first peripheral.

From a third aspect, the invention provides a method of configuring a connection between an event of a first peripheral and a task of a second peripheral in a peripheral communication system as set out above, comprising storing a mapping in memory comprising (i) an identification of the event of the first peripheral, and (ii) the address of a task register associated with the task of the second peripheral.

It will be seen by those skilled in the art that, in accordance with the invention, a programmable peripheral interconnect (PPI) allows an event signal from one peripheral to trigger a task in another peripheral, without needing to involve the processor. This can provide substantial power savings by allowing the processor to remain in a sleep state while peripherals communicate directly with each other. It can also enable quicker communication between peripherals. Importantly, a PPI embodying the present invention uses the address of a register on a task-receiving peripheral to define a channel to that peripheral. Thus, rather than having to send obscure peripheral and task identifiers as control signals to the interconnect apparatus in order to configure a channel, embodiments of the present invention allow firmware running on the processor to establish a channel easily and conveniently by using a familiar register address of the task-receiving peripheral.

Such an arrangement can provide considerable additional convenience for the programmer of firmware for the processor, since the same register addresses can be used for accessing task-receiving peripherals directly from the processor (e.g. via writes to the relevant task registers), and also for configuring a channel in the PPI by mapping the task register address to an event. This avoids the programmer having to refer to and use two different naming systems for the same task.

A manufacturer of products embodying the invention can easily re-engineer a design to add another peripheral simply by allocating addresses from a block of unused addresses to one or more registers associated with the peripheral. Similarly, peripherals can easily be removed from a system, without having to renumber a peripheral indexing system between different product variants. This can aid firmware interoperability across different versions of the system by maintaining consistent addressing in the PPI across versions.

The event-generating peripheral may comprise an event register, addressable by the processor, associated with the event. While the event register may be located immediately adjacent logic associated with the peripheral on an integrated circuit, this is not essential and it may be situated some distance away from other elements of the peripheral; the same is true for the task register. The registers may comprise any suitable memory structure.

The association between the event register and the event may be such that the system is configured to respond to a change in the contents of the event register as if the peripheral had signalled the event. Such an event register may be written to by the processor to simulate an event issuing from the peripheral, for example. The peripheral may change the contents of the event register itself when signalling an event; for example, by writing a binary '1' to the event register whenever it signals an event.

In some preferred embodiments, the aforesaid identification of the event of the first peripheral in the mapping is the address of an event register associated with the event. In this way, the benefits of using register addresses in the mapping are extended to the event-register also, and a channel can be configured simply by storing two register addresses in memory. Firmware running on the processor might do this via a function call or might write the addresses directly to the memory where the mapping is stored. This is not essential, however, and the identification of the event of the first peripheral could comprise a peripheral identifier and an event or signal line identifier, unrelated to the address of any associated event register which may or may not be present.

The peripheral interconnect is programmable in the sense that it can be programmed or configured to define connections between peripherals using one or more mappings. The PPI need not necessarily comprise a processing unit for executing software instructions, although it may do so.

The peripherals are not limited to any particular type, and may include such peripherals as: a timer, a UART, a voltage comparator, an encryption engine, an analogue-to-digital converter (ADC), a digital-to-analogue converter (DAC), a radio transmitter, a radio receiver, and so on. An event may be signalled from a peripheral in response to any input, change of state, satisfying of a criterion, etc., as will be familiar to one skilled in the art. The tasks may be any function or operation which can be performed by the peripheral, such as transmitting data over an interface.

The PPI may be connected to the peripherals by respective lines for each event and task over which event and task signals can be sent; i.e. one line for each event or task. The signals may be pulses or encoded values. Incoming lines may connect to one or more multiplexers within the PPI; e.g. with one multiplexer for each channel. Outgoing lines may leave from one or more demultiplexers within the PPI; e.g. with one demultiplexer for each channel. The PPI may be configured to set or control a multiplexer and a demultiplexer of a channel in accordance with a mapping stored in memory.

In some alternative embodiments, the PPI may access the task registers or event registers, or both, of peripherals over a bus, e.g. over an address bus using memory-mapped input/output (MMIO). The PPI may thus receive an event signal through a change in the contents of the associated event register and/or may send a task signal by changing the contents of the associated task register. The PPI may be connected to a bus (e.g. a system bus which may comprise an address bus, data bus and control bus) to which the processor is also connected. The same bus may connect the peripherals to the processor. The PPI may detect a change in the contents of an event register by reading the event register at intervals; e.g. regular polling; or by receiving an interrupt from the event-generating peripheral. On receiving an interrupt, the PPI may then read the contents of a corresponding event register.

An event register or task register may contain a single bit (i.e. for signalling a flag or binary signal), or it may comprise a plurality of bits, e.g. 8, 16 or 32 bits.

The memory mapping may take any suitable form. In some embodiments, the address of an event register and the address of a task register, or pointers to these registers, are stored as related entries in an array, table or database. For example, the PPI may maintain a table having a number of rows, each corresponding to a different channel, and two columns, the first for identifying an event register and the second for identifying a task register. It will be appreciated such an array or table can be a logical construct and need not necessarily be limited to any particular physical locations of the data in memory. The PPI may comprise a first set of registers for storing task-register addresses and a second set of registers for storing event-register addresses. There may be an equal number of registers in each set. A register in the first set may control a multiplexer which is connected to a demultiplexer controlled by a corresponding register in the second set, thereby defining a channel.

The memory may be separate from the PPI, e.g. in a separate region of silicon or on a different chip, but is preferably an integrated component of the PPI, which can reduce access times. The memory may be volatile (e.g. RAM) or non-volatile (e.g. EEPROM or flash). The mappings are preferably stored in one or more registers which are preferably addressable by the processor. Each channel provided by the PPI may have one associated event end-point register and one associated task end-point register, which may be suitable for storing an address of a peripheral event register and an address of a peripheral task register respectively. Some of the channels may use these registers to store other types of event and/or task identifiers.

The mapping or mappings may be written to the memory by the PPI or by the processor, or by both. The processor may indirectly establish a channel between peripherals by instructing the PPI to store the appropriate mapping.

The PPI preferably comprises, or can access, one or more lookup tables which it can use to look up a register address from a mapping in order to determine a particular event line or task line (or event port or task port) corresponding to that register address. It may then select the line or port as input or output for a channel (e.g. by controlling a multiplexer or demultiplexer appropriately). The lookup table may take any suitable form, and need not necessarily be implemented as a physical table in memory.

The PPI may support any number of channels; e.g. 1, 8, 16, 32 or more. A channel can be any physical (e.g. electrical) or logical connection between an event input port or line to the PPI and a task output port or line from the PPI. A channel may link one or more inputs to one or more outputs (e.g. using logic gates to define branches or forks along the channel path).

The PPI preferably comprises a mechanism for allowing a channel to be enabled and/or disabled. The PPI may comprise a bit-field register, having one bit associated with each channel, and be configured so that a channel is enabled if its associated bit in the bit-field register is set to a predetermined value (e.g. a binary 1).

In some preferred embodiments, the PPI comprises a mechanism for collectively enabling and disabling a group of one or more channels. The PPI may comprise one or more registers or memory areas, each capable of storing a plurality of channel identifiers for defining a respective group of channels. Such a group register may, for example, be a bit-field with each bit position corresponding to a different one of the channels; a binary 1 in the bit position may include that channel, while a binary 0 may exclude that channel (or the other way round). The system may be configured so that a single instruction or action by the processor can cause all the channels in a group to be enabled or disabled by the PPI; for example, by setting a bit corresponding to the appropriate group in a group-enable bit-field register on the PPI.

The PPI may be configured to receive a task signal from the processor and to enable or disable a particular group of channels in response. The PPI may comprise an incoming group-enable task signal line and an incoming group-disable task signal line for each group. Particularly advantageously, the PPI may be such that it can be configured or programmed (e.g. by the processor) so that a group of channels can be enabled or disabled in response to the PPI receiving an event signal from a peripheral. Each group enable and disable task may have an associated register address and be configurable using mappings in the PPI in the same way as for peripheral tasks.

The ability to configure the PPI to enable and disable a channel or group of channels in response to a peripheral event allows very flexible configuration. It can be used to avoid conflicts between tasks. For example, the PPI may first map a timer event to a task to disable a radio receiver (e.g. to save power by switching the radio off after a period of time). The PPI may secondly map a "disabled" event from the radio receiver to a task to enable the radio (e.g. to switch the radio on automatically when it starts to receive radio data). However, a problem can arise in that the timer may switch the radio off while it is still receiving radio data. By additionally having a third mapping between the "disabled" event from the radio receiver and a group-disable task on the PPI, where the group contains the channel implementing the first mapping, this conflict can be avoided. (Of course, the channel group should subsequently be re-enabled at an appropriate time).

The peripheral communication system will typically be part of a larger system, in which the processor performs control tasks. For example, a peripheral communication system embodying the invention may form part of a radio transceiver, such as a radio-on-a-chip.

An event-generating peripheral may have more than one event register. Similarly, a task-receiving peripheral may have more than one task register.

The PPI may be configurable to respond to an event signal by sending two or more task signals, possibly to different task-receiving peripherals. In some embodiments this may be accomplished by storing multiple mappings, each mapping the associated event register to a different one of the associated task registers. In other embodiments, it may be accomplished by storing a mapping which maps three or more associated registers together; e.g. by having a table in memory with three of more columns. Preferably the PPI can send multiple task signals simultaneously (e.g. within a single clock cycle).

Similarly, the PPI may be able to map a plurality of event registers to a single task register. As before, this may be by means of multiple mappings, or by a single mapping which relates to three or more registers.

In some embodiments, the PPI may comprise logic for sending a task signal when or only when a criterion relating to two or more event signals is met; e.g. once both event signals are next received.

The first and second peripherals will typically be different peripherals, although they may be the same. To configure the system so that an event generated by a peripheral is acted on by the same peripheral, the PPI may store a mapping between an associated event register and an associated task register belonging to the same peripheral. However, the present inventors have realised that, even though routing events via the PPI is more efficient than when involving the processor, the PPI still takes some time to channel event signals. Thus, in one set of embodiments, the system can be configured so that, for at least one of the peripherals, an event signal sent from the peripheral is received as a task signal by the same peripheral without passing through the PPI. This may be implemented, for example, by a physical or logical switch connecting an event line leading from the peripheral to a task line leading towards the peripheral. This switch may be arranged to be closed or open depending on a value in a register; for example, a single bit in a register. This register may be written to by the processor or by the PPI.

This idea is believed to be new and inventive in its own right, and therefore, from a further aspect, the invention provides a peripheral communication system comprising:
  a processor;
  a plurality of peripherals, connected to the processor; and
  a programmable peripheral interconnect, connected to each peripheral,
wherein:
  at least one of the peripherals is event-generating and can signal an event to the programmable peripheral interconnect;
  at least one of the peripherals is task-receiving, and can receive a task signal from the programmable peripheral interconnect and perform a task in response to receiving the task signal;
  the programmable peripheral interconnect can be configured to send a task signal to a task-receiving peripheral in response to receiving an event signal from an event-generating peripheral; and
  at least one of the peripherals is both event-generating and task-receiving and the system can be configured so that the peripheral will perform a task in direct response to an event generated by the peripheral, without the peripheral receiving a task signal from the processor or programmable peripheral interconnect.

From another aspect, the invention provides a peripheral communication method for use in a system comprising:
  a processor;
  a plurality of peripherals, connected to the processor; and
  a programmable peripheral interconnect, connected to each peripheral, the method comprising:
  one of the peripherals signalling an event to the programmable peripheral interconnect, the programmable peripheral interconnect sending a task signal to a task-receiving peripheral in response, and the task-receiving peripheral receiving the task signal and performing a task in response; and
  one of the peripherals generating an event signal and performing a task in direct response to the event signal, without receiving a task signal from the processor or programmable peripheral interconnect.

It will be seen that the system provides a shortcut mechanism for at least one peripheral, whereby communication with the PPI can be bypassed when the peripheral is set to respond to its own event signal. Configuring the PPI to establish channels between peripherals may be undertaken by the processor, as described previously. The configuring of the system to cause the peripheral to respond directly to its own event signal may be performed by the PPI or by the processor; e.g. by one of more instructions issued from the processor, or by one or more register accesses performed by the processor. In a similar manner, the configuration may be changed so that the peripheral will no longer perform a task in direct response to an event generated by the peripheral.

The system may comprise a shortcut path between an event path or line leading from the peripheral towards the PPI and a task path or line leading into the peripheral from the PPI. This shortcut path may be an electrical line comprising a switch to open or close the path. The switch may be implemented in any suitable manner. The switch may be controlled by a bit position in a register, addressable by the processor. Where the signals are pulses, the shortcut path and the task path from the PPI may both enter a logical OR gate, the output of which leads towards the peripheral. The shortcut path may form part of the peripheral, or it may be a separate element of the system.

Features described elsewhere in connection with other aspects or embodiments of the invention may be optional features of this aspect also.

In one example system, the peripheral is a timer which is able to receive a start task and respond by starting counting from zero, and which is also able to signal an overflow event when its counter overflows. The processor may be instructed to configure the system so that the timer automatically restarts counting from zero when its counter overflows, rather than simply stopping counting. To do this, it may instruct the programmable peripheral interconnect to create a channel between the timer's overflow event and its start task. The PPI may recognise that the event and task belong to the same peripheral and, instead of creating a channel as it would between two different peripherals, may enable a shortcut path which causes the timer to perform its start task in response to generating its overflow event. Alternatively, the processor may enable the shortcut path itself. In either case, the restarting of the timer can happen more quickly (i.e. in few clock cycles) than if the communication were routed via the PPI or the processor.

This shortcut mechanism may be used in combination with the previously-described register-based communication system, or in any appropriate known arrangements.

A peripheral may have one or more predefined (i.e. hardwired) shortcut paths, which can simply be enabled and disabled by firmware on the processor.

Alternatively, shortcuts may be programmable. For example, the peripheral may comprise a multiplexer and/or demultiplexer. It may be configured to access a memory in which a mapping between an event register address of the peripheral and a task register address of the peripheral can be stored. This memory may be separate from the peripheral, but is preferably part of the peripheral, to speed up read access to the mapping by the peripheral. The mapping or mappings may be similar to those of the PPI described above and may be used similarly.

Any preferred or optional feature of one aspect of embodiment described herein may, wherever appropriate, be used in any other aspect or embodiment. Embodiments may contain preferred or optional features in any appropriate combinations.

Certain preferred embodiments of the invention will now be described, by way of example only, with reference to the accompanying drawings, in which.

Figure 1:
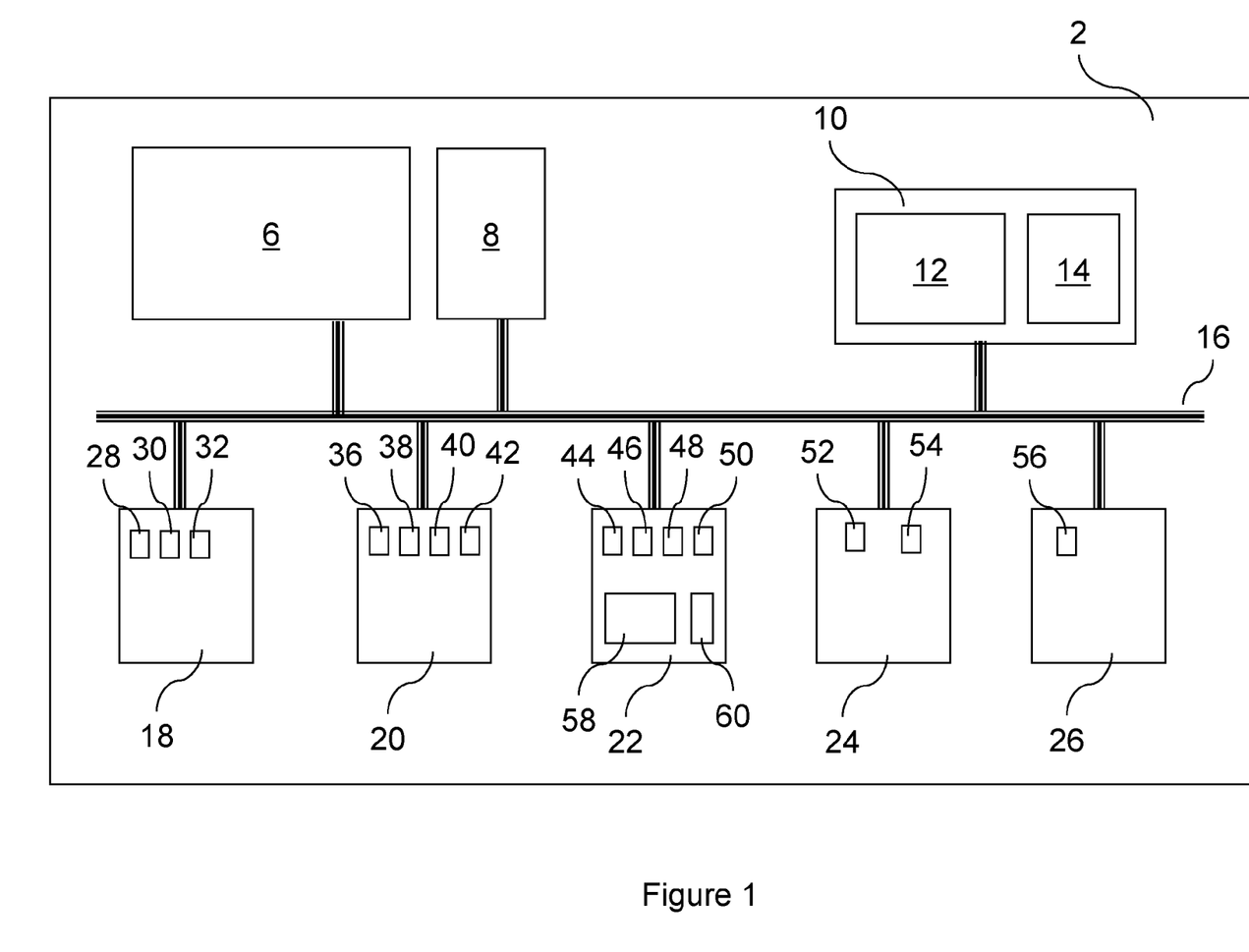
FIG. 1 is a schematic drawing showing components of a first system embodying the invention.

FIG. 1 shows a microcontroller (MCU) 2 (e.g. an integrated circuit or a multi-chip module) which includes a central processing unit (CPU) 6, a main memory 8, and a PPI 10, having a logic area 12 and an internal memory 14. The CPU 6 and PPI 10 are both connected to a bus 16.

Also connected to the bus 16 are five exemplary peripherals: a timer 18, a DAC 20, a UART 22, a hardware encryption engine 24, and a voltage comparator 26.

Alternatively, there may be a dedicated bus for signalling tasks and events, separate from the CPU bus; i.e. the bus 16 may be formed of two or more separate buses.

The timer 18 has an output event register 28, an overflow event register 30 and an input task registers 32. The DAC 20 has two conversion-finished event registers 36, 38 and two trigger task registers 40, 42. The UART 22 has an RX received event register 44, a TX complete event register 46, an RX trigger task register 48 and a TX trigger task register 50. The hardware encryption engine 24 has an encryption-finished event register 52 and a trigger task register 54, while the voltage comparator 26 has a single comparator output event register 56. Some of the registers are single-bit registers, while others can hold a multi-bit value. Of course, other embodiments may have different peripherals, and the peripherals may have any number of event or task registers.

The peripheral registers share a memory addressing space with the main memory 8 and the PPI memory 14, so that they can be accessed using memory-mapped I/O by the PPI logic 12 and optionally by the CPU 6.

The UART peripheral 22 has logic 58 for implementing shortcuts and an associated memory area 60.

In use, the CPU 6 might, for example, instruct the PPI 10 to create a channel connecting one of the DAC 20 conversion-finished events to the UART 22 trigger task, so that the UART 22 transmits data after a DAC conversion has completed. On receiving this instruction, the PPI 10 creates a new entry in a table held in its memory 14, linking the address of the DAC 20 conversion-finished register 36 and the address of the UART 22 trigger task register 48.

Figure 2:
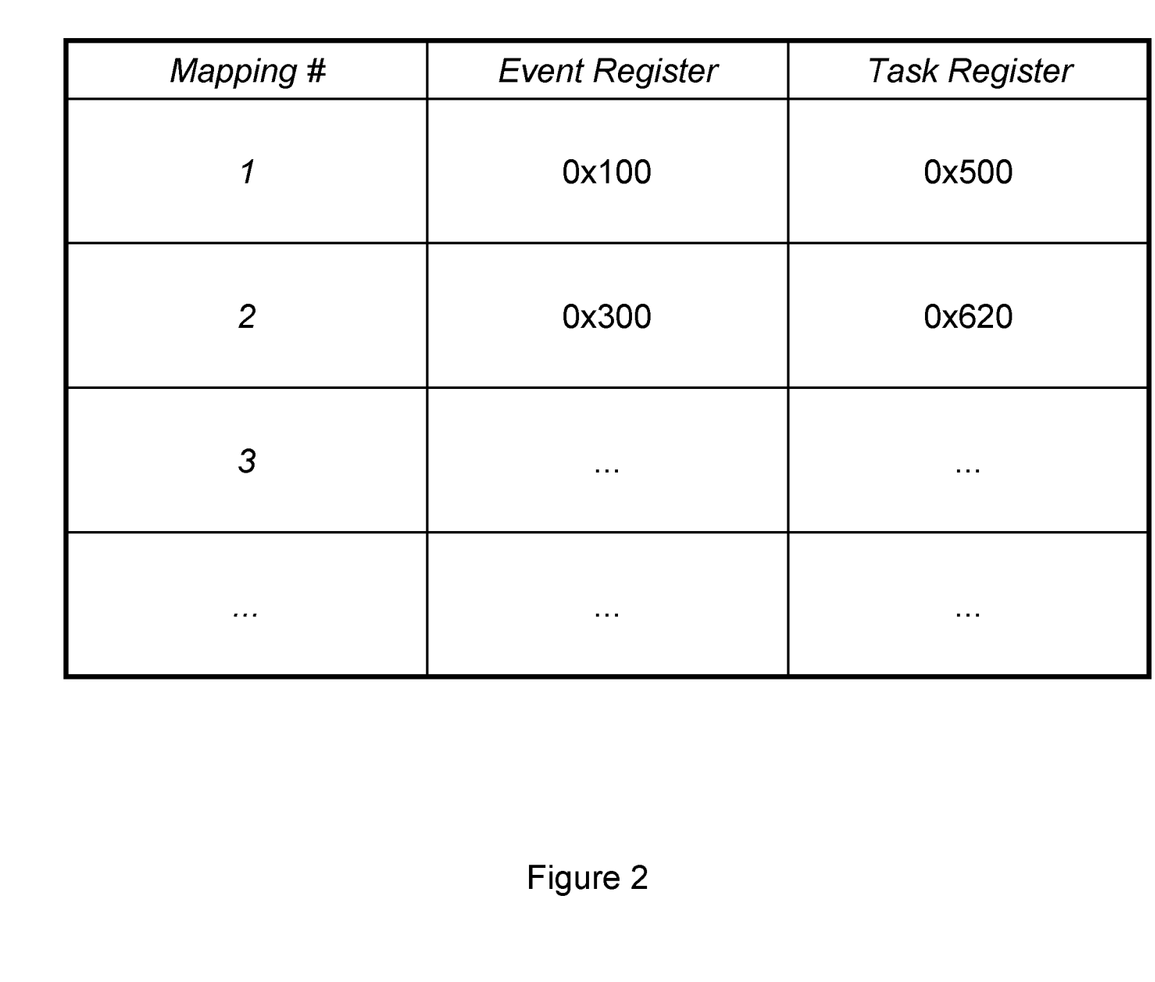
FIG. 2 is a table representing a memory structure storing mappings between peripheral registers.

FIG. 2 shows a logical data structure which may be stored in the PPI's memory 14. It has a number of rows, each of which contains a mapping number, an event register address and a task register address.

The PPI logic 12 is configured to poll every event register listed in the table periodically, to determine when a value in the register changes. When a change is detected, the PPI logic 12 writes the new value to all task registers which are mapped to the particular event register in the table.

The PPI logic 12 may optionally be configured to perform some processing on the new value in the event register and instead write a result of the processing to one or more of the task registers. For example, if the event register contains a multi-bit value, the PPI logic 12 could be configured to determine whether it is higher than the previous value and write a one bit to a single-bit task register in accordance with a mapping in the memory 14. The PPI 10 could be instructed as to what processing (if any) to perform by the CPU 6. The type of processing may be stored as a further column in the mapping table.

When the CPU 6 acts to shut down a channel, it can do this straightforwardly by causing the relevant entry in the table stored in the PPI's memory 14 to be erased. It does not need to instruct the peripherals directly (although it may of course also do this, in some circumstances).

The event registers 44, 46 and task registers 48, 50 of the UART 22 can be included in mappings stored in the PPI's memory 14. However, the UART 22 also has the facility to implement shortcut channels between its own event registers 44, 46 and its task registers 48, 50 which by-pass the PPI logic 12, and which can therefore act faster still. The PPI 10 can instruct the UART 22 to establish, for example, a channel between its RX received event register 44 and its TX trigger register 50 so that it starts transmitting data as soon as it has finished receiving data.

The UART 22 shortcut logic 58 (or the PPI 10 itself) writes the addresses of the RX received event register 44 and the TX trigger register 50 as a mapped pair in the UART's memory 60. This may be formatted similarly to the mappings in the PPI's memory 14 (see FIG. 2). The UART 22 shortcut logic 58 then polls the addresses of any of its event registers 44, 46 stored in its memory 60, and, on detecting a change, writes a value in the linked task register 48, 50, in a similar manner to the PPI 10.

FIGS. 3-6 relate to an alternative embodiment in which the PPI controller is connected to the peripherals using individual lines for each event and task signal, rather than using memory-mapped input/output as in FIG. 1. This second embodiment nonetheless shares many common operating principles with the first embodiment.

Figure 3:
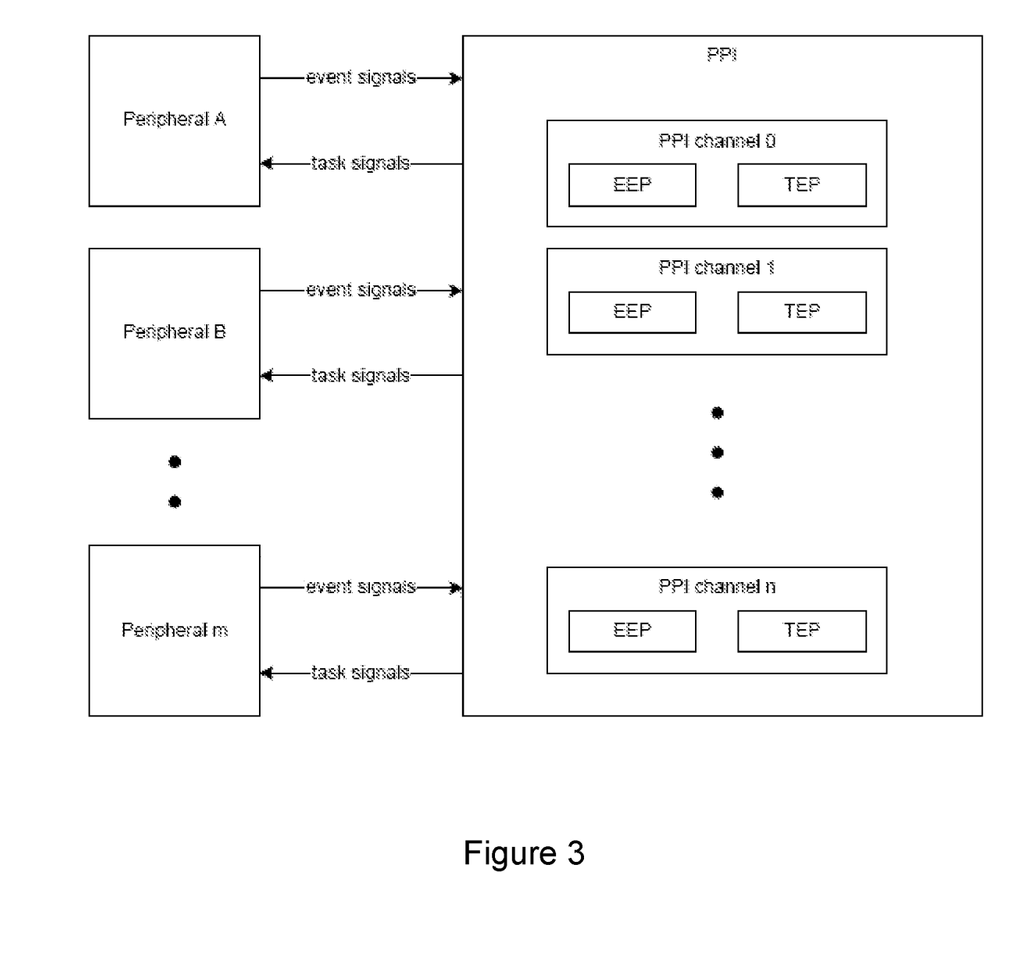
FIG. 3 is a schematic drawing of several peripherals connected to a PPI in a second system embodying the invention.

FIG. 3 shows m peripherals which are connected to the PPI. The PPI provides n channels, each of which has an associated event end-point register (EEP) and task end-point register (TEP). Each of these registers can hold the address of a register on one of the peripherals.

Figure 4:
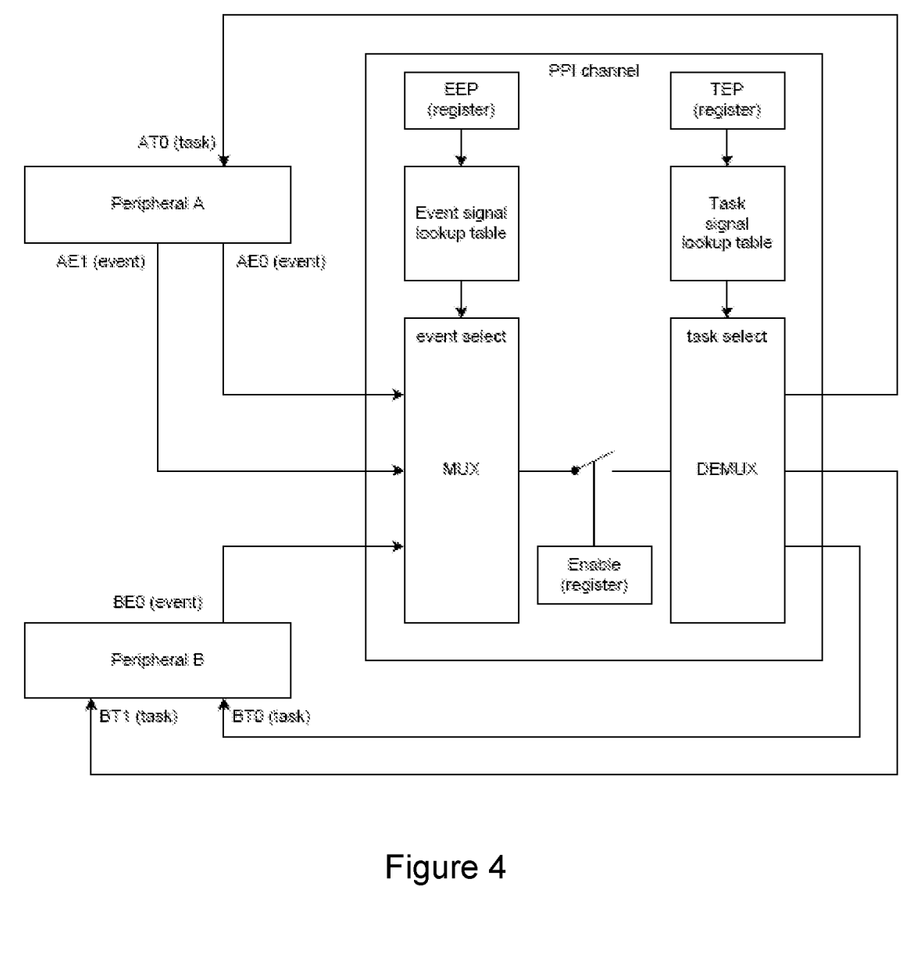
FIG. 4 is a schematic drawing of elements relating to a particular channel within the PPI.

FIG. 4 provides more detail of elements associated with one of these n channels. Each of the channels has a similar set of elements. The channel's EEP is connected to an event signal lookup table which cross-references a set of peripheral event register addresses with an internal event line identifier which relates to one of the inputs to a multiplexer (MUX) in the PPI, associated with the channel. The PPI is configured to set the MUX to select the input associated with the address contained in the EEP.

Similarly, the channel's TEP is connected to a task signal lookup table which cross-references a set of peripheral task register addresses with an internal task line identifier which relates to one of the output of a demultiplexer (DEMUX) in the PPI, associated with the channel. The PPI is configured to set the DEMUX to select the output associated with the address contained in the TEP Two peripherals A, B are connected to the channel's MUX. Peripheral A can provide two event signals AE0, AE1, each of which has its own line into the MUX. Peripheral B can provide a single event signal BE0 which also has a line into the MUX. Similar lines will connect to the multiplexers of the other n−1 channels (not shown).

The channel's DEMUX is connected to three output lines, one leading to a task input AT0 on peripheral A and two leading to different task inputs BT0, BT1 on peripheral B.

Within the PPI, the output from the MUX is connected through a switch to the input to the DEMUX. The connection is made when the switch is closed, so that an event signal (e.g. a pulse) from one of the peripheral selected by the MUX is passed to the DEMUX and thence on to a selected task input of one of the peripherals. The switch's state is controlled by a register, writable to by a CPU (not shown).

In some alternative arrangements, one channel may have multiple demultiplexers, each connected to the output of the channel's MUX. In this way, a single event can be forked so as to trigger a plurality of peripheral tasks.

Figure 5:
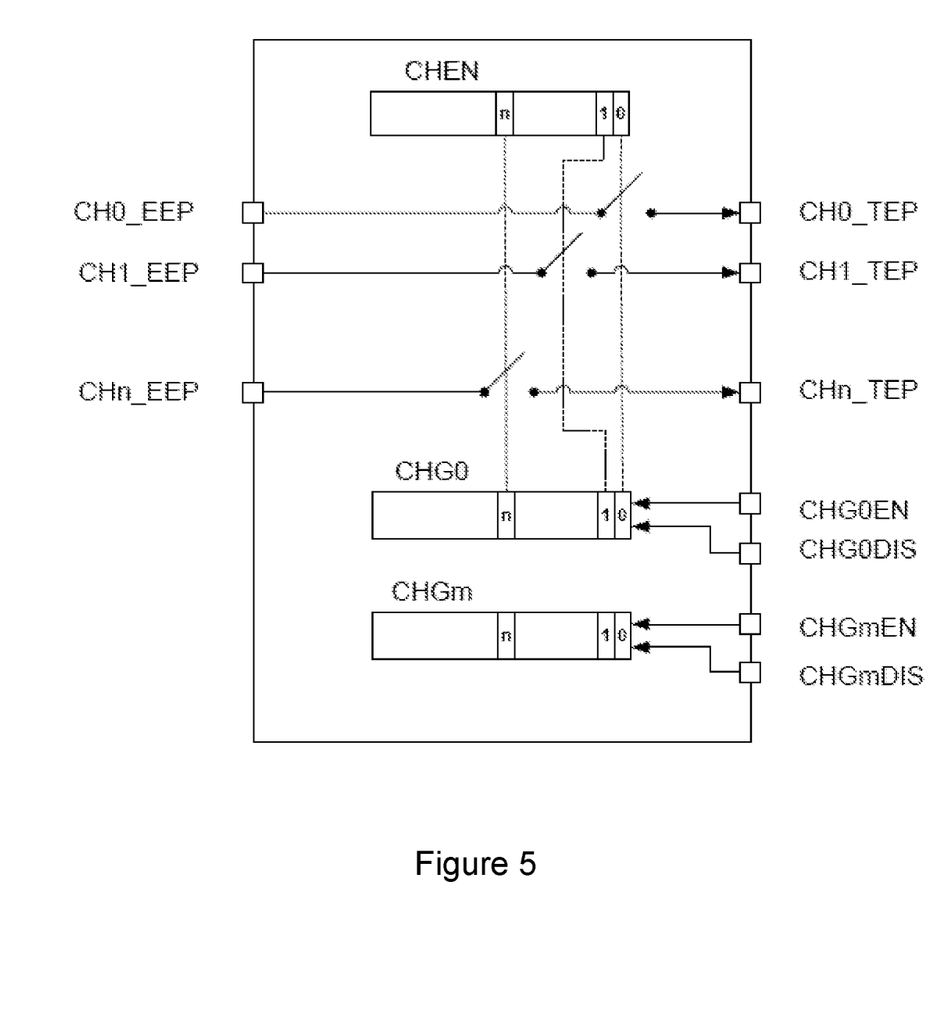
FIG. 5 is a schematic drawing of the channel- and group-enable and disable mechanisms within the PPI.

FIG. 5 figuratively shows the mechanisms inside the PPI whereby individual channels can be enabled and disabled, and whereby groups of channel can be enabled and disabled. Each channel i is represented as a path from an EEP to a TEP (labelled CHi_EEP and CHi_TEP respectively) with a switch in the path. The switch for a given channel corresponds to the switch situated between the MUX and DEMUX in FIG. 4.

The bit-field register CHEN has one bit associated with each channel switch. A CPU (or other component of the system) can enable or disable a channel by writing the appropriate bit to the CHEN register.

Up to m groups of channels can be configured by setting bits corresponding to the desired channels in the respective channel group bit-field registers CHG0 to CHGm. Each group has an associated enable task and an associated disable task. When triggered, these tasks enable or disable the channels which belong to that group. Each of these tasks has an associated task register CHG0EN-CHGmEN (enable) and CHG0DIS-CHGmDIS (disable), which can be used to trigger the task by a CPU writing to the register. Additionally, an address of any of these task registers can be entered into a task end-point register (TEP) in the PPI to create a map between it and an event signal from a peripheral.

Figure 6:
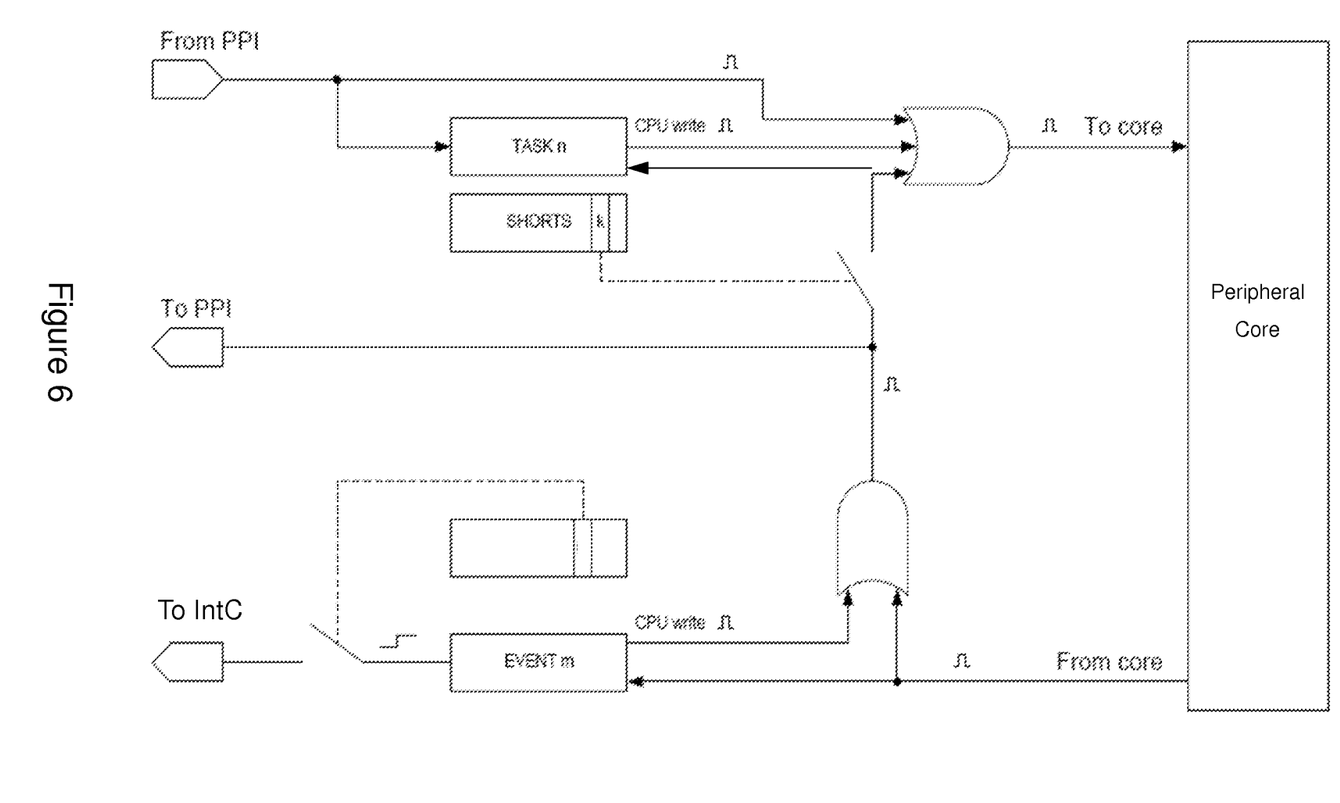
FIG. 6 is a schematic drawing showing peripheral event and task registers, and the shortcut mechanism for a peripheral.

FIG. 6 figuratively illustrates connections associated with a particular peripheral for linking to the PPI and for implementing a shortcut feature. The shortcut components will be described as being inside the peripheral but they could equally be situated outside it.

For a particular task n, the peripheral receives an input line from the PPI along which a task signal can be sent. The peripheral also has a task register (TASK n) associated with the task which sends a signal to trigger the task if firmware running on a CPU writes a binary 1 to the task register. The contents of the task register can also be updated when the PPI sends a task signal or when a signal is received through the shortcut mechanism. The line from the PPI and the output of the task register are combined in a logical OR gate and sent to the peripheral's core, which carries out the task when a signal is received. The OR gate can also receive a signal from a third source: the shortcut switch, described below.

The peripheral core can output an event signal when in an appropriate state. This is sent to an event register (EVENT m) where it causes the contents of the register to change to indicate that an event has been signalled. The same event signal is also split and sent to a second OR gate which leads to the shortcut switch and also to an event input line on the PPI. This OR gate also receives an input from the event register, which sends a signal to simulate the event having occurred if firmware writes a binary 1 to the event register.

The state of the event register can also be sent via a switch to an interrupt controller IntC, the details of which are not relevant to the present invention.

As already mentioned, the output from the second OR gate leads via a switch to an input to the first OR gate. This switch is controlled by the value of an associated bit k in a bit-field register SHORTS, associated with the peripheral. The register SHORTS may be part of the peripheral or may be located elsewhere in the system.

A CPU or other device (including potentially the PPI) can use this mechanism to create a shortcut between the task output of the peripheral core and the event input to the core by writing a '1' bit to the relevant shortcut position k in SHORTS. This causes signals to be routed directly within or adjacent the peripheral, without needing to create a channel through the PPI, thereby saving clock cycles and improving responsiveness. The event signal is still also sent to the PPI in case there are other tasks mapped to it.

In summary, a novel peripheral communication system has been described, which has advantages over previously known system.

The invention claimed is:

1. A peripheral communication system comprising:
a processor;
a plurality of peripherals, connected to the processor; and
a programmable peripheral interconnect, connected to each peripheral, wherein:
at least one of the peripherals is event-generating, being configured to signal an event to the programmable peripheral interconnect;
at least one of the peripherals is task-receiving, being configured to respond to a task signal from the programmable peripheral interconnect by performing a task;
said task-receiving peripheral comprises a task register, addressable by the processor, associated with the task, and is configured to perform the task in response to a change in the contents of the task register;
the programmable peripheral interconnect is configured to access a memory in which a mapping can be stored between an event of a first peripheral and a task of a second peripheral, the mapping comprising (i) an identification of the event of the first peripheral, and (ii) an address of a task register associated with the task; and
the programmable peripheral interconnect is configured so that, if a mapping is stored in memory between an event of a first peripheral and a task of a second peripheral, the interconnect will provide a channel by sending a task signal to the second peripheral in response to a signal of the event from the first peripheral.

2. The peripheral communication system of claim 1, wherein the event-generating peripheral comprises an event register, addressable by the processor, associated with the event, and wherein said mapping comprises the address of an event register associated with the event.

3. The peripheral communication system of claim 1, wherein the programmable peripheral interconnect is connected to the peripherals by respective lines for each event and task.

4. The peripheral communication system of claim 1, wherein the programmable peripheral interconnect comprises at least one multiplexer and at least one demultiplexer and is configured to control the multiplexer and the demultiplexer in accordance with the mapping that can be stored in the memory.

5. The peripheral communication system of claim 1, wherein the programmable peripheral interconnect is configured to receive an event signal from a peripheral by detecting a change in the contents of an associated event register on the peripheral.

6. The peripheral communication system of claim 1, wherein the programmable peripheral interconnect is configured to send a task signal to a peripheral by changing the contents of an associated task register on the peripheral.

7. The peripheral communication system of claim 1, wherein each said event or task signal is an electrical pulse.

8. The peripheral communication system of claim 1, wherein the memory in which the mapping can be stored comprises one or more registers which are addressable by the processor.

9. The peripheral communication system of claim 1, wherein the programmable peripheral interconnect is configured to access a lookup table to determine a line or port corresponding to a register address contained in the mapping that can be stored in the memory.

10. The peripheral communication system of claim 1, wherein the programmable peripheral interconnect comprises a mechanism for enabling or disabling a channel.

11. The peripheral communication system of claim 1, wherein the programmable peripheral interconnect comprises a mechanism for collectively enabling and disabling a group of one or more channels.

12. The peripheral communication system of claim 11, wherein the programmable peripheral interconnect comprises one or more registers or memory areas, each capable of storing a plurality of channel identifiers for defining a respective group of channels.

13. The peripheral communication system of claim 11, configured so that a single instruction or action by the processor can cause all the channels in a group to be enabled or disabled by the programmable peripheral interconnect.

14. The peripheral communication system of claim 11, wherein the programmable peripheral interconnect comprises, for each group of channels, a respective incoming group-enable task signal line and a respective incoming group-disable task signal line.

15. The peripheral communication system of claim 11, wherein the programmable peripheral interconnect can be configured so that a group of channels can be enabled or disabled in response to the programmable peripheral interconnect receiving an event signal from a peripheral.

16. The peripheral communication system of claim 11, wherein the programmable peripheral interconnect comprises a task register associated with the task of enabling or disabling a group of channels, and wherein the peripheral interconnect is configured so that, if a mapping is stored in memory comprising an identification of an event of a peripheral and the address of said task register, the interconnect will enable or disable the group of channels in response to a signal of the event from the peripheral.

17. The peripheral communication system of claim 1, configured so that, for at least one of the peripherals, an event signal sent from the peripheral is received as a task signal by the same peripheral without passing through the programmable peripheral interconnect.

18. A programmable peripheral interconnect configured for connection to each of a plurality of peripherals, wherein:
at least one of the peripherals is event-generating, being configured to signal an event to the programmable peripheral interconnect;
at least one of the peripherals is task-receiving, being configured to respond to a task signal from the programmable peripheral interconnect by performing a task;
said task-receiving peripheral comprises a task register, addressable by a processor, associated with the task, and is configured to perform the task in response to a change in the contents of the task register;
the programmable peripheral interconnect is configured to access a memory in which a mapping can be stored between an event of a first peripheral and a task of a second peripheral, the mapping comprising (i) an identification of the event of the first peripheral, and (ii) an address of a task register associated with the task; and
the programmable peripheral interconnect is configured so that, if a mapping is stored in memory between an event of a first peripheral and a task of a second peripheral, the interconnect will respond to a signal of the event by sending a task signal to the second peripheral.

19. The programmable peripheral interconnect of claim 18, wherein the event-generating peripheral comprises an event register, addressable by the processor, associated with the event, and wherein said mapping comprises the address of an event register associated with the event.

20. The programmable peripheral interconnect of claim 18, wherein the programmable peripheral interconnect comprises respective ports for each event and task.

21. The programmable peripheral interconnect of claim 18, comprising at least one multiplexer and at least one demultiplexer, and configured to control the multiplexer and the demultiplexer in accordance with the mapping stored in the memory.

22. The programmable peripheral interconnect of claim 18, wherein the programmable peripheral interconnect is configured to send a task signal to a peripheral by changing the contents of an associated task register on the peripheral.

23. The programmable peripheral interconnect of claim 18, wherein the memory in which the mapping can be stored comprises one or more registers.

24. The programmable peripheral interconnect of claim 18, configured to access a lookup table to determine a line or port corresponding to a register address contained in the mapping that can be stored in the memory.

25. The programmable peripheral interconnect of claim 18, wherein the programmable peripheral interconnect comprises a mechanism for enabling or disabling a channel.

26. The programmable peripheral interconnect of claim 18, comprising a mechanism for collectively enabling and disabling a group of one or more channels.

27. The programmable peripheral interconnect of claim 26, comprising one or more registers or memory areas, each capable of storing a plurality of channel identifiers for defining a respective group of channels.

28. The programmable peripheral interconnect of claim 26, configured to enable or disable all the channels in a group in response to a single instruction or action by a processor.

29. The programmable peripheral interconnect of claim 26, comprising, for each group of channels, a respective group-enable task signal input port and a respective group-disable task signal input port.

30. The programmable peripheral interconnect of claim 26, comprising a mechanism for configuring the interconnect so that a group of channels can be enabled or disabled in response to receiving an event signal from a peripheral.

31. The programmable peripheral interconnect of claim 26, comprising a task register associated with the task of enabling or disabling a group of channels, and configured so that, if a mapping is stored in memory comprising an identification of an event of a peripheral and the address of said task register, the interconnect will enable or disable the group of channels in response to a signal of the event from the peripheral.

32. A method of configuring a connection between an event of a first peripheral and a task of a second peripheral in the peripheral communication system of claim 1, the method comprising storing a mapping in memory comprising (i) an identification of the event of the first peripheral, and (ii) an address of a task register associated with the task of the second peripheral.

* * * * *